2,811,497

SOLUTIONS OF SYNTHETIC LINEAR CONDENSATION POLYMERS IN DIMETHYLSULFONE AND PROCESS FOR MAKING SAME

George E. Ham, Decatur, Ala., assignor to The Chemstrand Corporation, Decatur, Ala., a corporation of Delaware No Drawing. Application April 25, 1955, Serial No. 503,823

9 Claims. (Cl. 260—30.8)

This invention relates to compositions of matter, and more particularly, to new and useful compositions of matter comprising solutions of synthetic linear condensation polymers.

The synthetic linear condensation polymers with which this invention is concerned are those polymers which may generally be designated as polyamides, polyesters, and polyurethanes. The polyamides embraced by this invention are those containing as an integral part of the main polymer chain recurring groups of the general formula

wherein R is hydrogen or a monovalent hydrocarbon radical and which groups are separated by an average number of carbon atoms of at least two. The synthetic linear condensation polyesters of interest in this invention are those polyesters derived from dibasic acids and glycols in which the terminal hydroxy groups are separated by from two to ten methylene groups inclusive. The synthetic linear condensation polyurethanes concerned here are those containing as an integral part of the main polymer chain recurring groups of the general formula

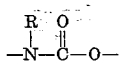

wherein R is hydrogen or a monovalent hydrocarbon radical and which groups are separated by an average number of carbon atoms of at least two.

It is well-known that all these synthetic linear condensation polymers are capable of being fabricated into many useful objects, including high-strength fibers and extrusion moldings. The conventional technique for preparing fibers and moldings from these polymers involve spinning, extruding, or otherwise forming the object from the molten polymer. There are certain advantages, however, in the use of solutions rather than molten compositions to achieve the fluid state necessary in lacquers, coating compositions, and dopes suitable for use in forming objects such as films, fibers, sheets, ribbons, bristles, and filaments. It is often desirable to prepare a fluid composition for use over a period of time and in that event it is convenient if the composition can be kept in a liquid state by storage at ordinary temperatures. The application of such solutions as lacquers and adhesives is much more easily carried out by methods well-known to the art than the application of a molten composition. Further, the incorporation of plasticizers or other modifying agents in the polymers can frequently be accomplished more advantageously by addition of the plasticizer to a solution of the polymer rather than to the molten polymer, thus minimizing the tendency toward discoloration and decomposition which frequently occurs when blending in the melt. Again, there is a tendency with certain types of plasticizers and modifying agents to be less compatible at the high temperatures required for blending in the melt, whereas they can be readily incorporated in the polymer solution at a lower temperature. A still further advantage in the use of solutions lies in the ease with which they can be cast into films or coatings of uniform thickness, which is mechanically more difficult to accomplish with a molten composition due to its relatively high viscosity.

Another important utilization of solutions of synthetic linear condensation polymers lies in the recovery of waste and scrap material from several sources, e. g., rejects during manufacture, turnings from the machining of solid polymer shapes, skeleton scrap resulting when parts are stamped from polymer strips, trimmings from the cutting of polymer fabric, and used polymer cloth and articles. If this scrap or waste is absolutely clean, it can be remelted under controlled conditions and used over again, but often such material is contaminated with foreign materials such as dirt, oil, grease, or floor sweepings, or it may contain unwanted impurities such as woolen thread, delustrants, etc.

Several solvents for the synthetic linear condensation polymers concerned here are known to the prior art, but most are not practical for one reason or another. The polyamides and polyesters characteristically require corrosive media such as strong concentrated acids, acid anhydrides, phenols, cresols, and the like, as solvents, where solutions of the polyamides having useful degrees of concentration are needed. Very few solvents for the synthetic linear condensation polyurethanes as a class have been proposed in the past, and those that have been proposed are impractical due to various disadvantages such as excessive cost, poor color, and solution only at or near the boil. Moreover, mutual solvents for all three of the types of synthetic linear condensation polymers concerned are rare. Therefore, though it has been desirable in the past to blend members of the three classes in solution, such has not always been feasible.

The primary purpose of this invention is the provision of new and useful compositions of matter comprising synthetic linear condensation polymer solutions which are useful in making threads, filaments, bristles, ribbons, coatings, and the like. A further purpose of this invention is to provide a new low-cost solvent for the preparation of synthetic linear condensation polymer fibers. A still further purpose of the invention is to provide a mutual solvent by which synthetic linear polyamides, polyesters, and polyurethanes may be solution blended. Other objects of the invention will become apparent from the description hereinafter.

It has now been found that these and other objects of the invention can be accomplished by dissolving synthetic linear condensation polymers selected from the group consisting of polyamides, polyesters, and polyurethanes in molten dimethylsulfone. Dimethylsulfone is a solid melting at 115° C. The polymers can be mixed with either solid or molten dimethylsulfone. The temperature to which it is necessary to heat a mixture of dimethylsulfone and one of the linear condensation polymers described in order to effect solution will, of course, depend upon the composition of the polymer. Thus, it has been found that the polyamides can be dissolved at temperatures ranging from about 190° to 250° C., the polyesters at temperatures of from about 220° to 260° C., and the polyurethanes at temperatures of from about 140° to 200° C. In general, therefore, homogenous solutions will result from heating to a temperature between about 140° and about 260° C.

While each polymer varies somewhat in its solubility characteristics and the temperature of solvation, this invention is applicable to all synthetic linear condensation polymers selected from the group consisting of linear polyamides containing as an integral part of the main polymer chain recurring groups of the general formula

wherein R is hydrogen or a monovalent hydrocarbon radical and which groups are separated by an average number of carbon atoms of at least two, linear polyesters derived from dibasic acids and glycols in which the terminal hydroxy groups are separated by from two to ten methylene groups inclusive, and linear polyurethanes containing as an integral part of the main polymer chain recurring groups of the general formula

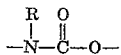

wherein R is hydrogen or a monovalent hydrocarbon radical and which groups are separated by an average number of carbon atoms of at least two. Linear polyamides which fall within the above description are of two types, those derived from polymerizable monoaminomonocarboxylic acids or their amide-forming derivatives, and those derived from the reaction of suitable diamines with carboxylic acids. This invention is particularly concerned with the simple, unsubstituted polyamides, such as the polymers formed by the reaction of tetramethylene diamine with adipic acid, tetramethylene diamine with suberic acid, tetramethylene diamine with sebacic acid, hexamethylene diamine with adipic acid, hexamethylene diamine with suberic acid, hexamethylene diamine with sebacic acid, or the polymerization product of epsilon-caprolactam.

As stated above, the linear polyesters embraced by this invention include all simple linear condensation polyesters which are derived from dibasic acids, both aliphatic and aromatic, and ester-forming derivatives thereof, and a glycol in which the terminal hydroxy groups are separated by from two to ten methylene groups inclusive. The polyesters with which this invention is concerned can be derived from aliphatic dibasic acids such as oxalic, adipic, pimelic, suberic, azelaic, sebacic, succinic, malonic, brassylic, thapsic, japanic, glutaric, methylsuccinic, methylmalonic, etc. Those polymers most suitable for spinning into fibers are derived from the aromatic dibasic acids or their ester-forming derivatives such as orthophthalic, isophthalic, terephthalic, homophthalic, 4,4'-diphenyldicarboxylic, p,p'-dicarboxydiphenyl sulfone, p,p'-dicarbomethoxydiphenyl sulfone, naphthalene-1,5-dicarboxylic, p-carboxyphenoxyacetic, p-carboxyphenoxypropionic, p - carboxyphenoxybutyric, etc. The polyesters with which this invention is concerned are derived from any of the above-described dibasic acids when polymerized with a glycol in which the terminal hydroxy groups are separated by from two to ten methylene groups inclusive, such as ethylene glycol, trimethylene glycol, tetramethylene glycol, pentamethylene glycol, hexamethylene glycol, heptamethylene glycol, octamethylene glycol, nonamethylene glycol, and decamethylene glycol.

This invention is likewise applicable to all synthetic linear condensation polyurethanes containing as an integral part of the main polymer chain recurring groups of the general formula

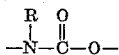

wherein R is hydrogen or a monovalent hydrocarbon radical and which groups are separated by an average number of carbon atoms of at least two. Linear polyurethanes which fall within the above description are of three types, those derived by the polymerization of a bis-chloroformate of a suitable diol containing at least two carbon atoms between the chloroformate groups and a diamine containing at least two carbon atoms between the amino groups, those derived by the polymerization of a suitable diol and a diisocyanate containing at least two carbon atoms between the cyano groups, and those derived by the polymerization of the product of an ester-interchange reaction between a methyl urethane and a suitable diol. The bis-chloroformates of the suitable diols may be obtained by reacting phosgene, i. e., carbonyl chloride, with the diol. The diisocyanate may be obtained by reacting phosgene with a suitable diamine.

Diols suitable for forming the polyurethanes useful in this invention include those such as ethylene glycol, trimethylene glycol, and 1,4-butanediol, for example. Higher glycols where the alkylene chain contains a greater number of carbon atoms, straight chain or branched chain, are also satisfactory. Examples of other diols which can be employed are the omega, omega'-dihydroxydialkyl ethers or thioethers, bis-glycol or diglycol ethers of straight chain or branched chain aliphatic dicarboxylic acids, dimer or trimer esters obtained by the conversion of an excess of an aliphatic glycol with a dicarboxylic acid, and cycloaliphatic glycols. The diamines which can be employed in forming the polyurethanes with which this invention is concerned are ethylene diamine, triethylene diamine, tetramethylene diamine, pentamethylene diamine, hexamethylene diamine, ortho-, meta-, or paraphenylene diamine, cyclohexylene diamine, and nuclear substituted-phenylene diamines and nuclear substituted-cyclohexylene diamines. The polyurethanes may also be derived from more highly substituted diamines such as, for example, omega, omega'-di-(3-aminopropoxy)-alkanes, bis-(omega-aminoalkyl) ethers, bis-(omega-aminoalkyl)-sulfides, omega, omega'-diaminodialkyl benzenes, diaminonaphthalenes, diaminodiphenyls, omega-aminoalkyl anilines, omega-aminoalkyl cyclohexylamines, diaminodiphenyl sulfones or diamino benzophenones.

The higher molecular weight polymers (those having an intrinsic viscosity above 0.4) possess the inherent capability of being formed into filaments which can be cold drawn into fibers showing by characteristic X-ray patterns orientation along the fiber axis. Intrinsic viscosity of the synthetic linear condensation polymers is defined as $$\frac{\log_e \eta r}{C}$$

in which $\eta r$ is the viscosity of a dilute solution (e. g., 0.5 percent) of the linear polymer in a suitable solvent divided by the viscosity of the solvent at the same temperature (e. g., 25° C.) in the same units, and C is the concentration of polymer in grams per 100 cc. of solution. A suitable solvent for determination of intrinsic viscosity of polyamides and polyurethanes is meta-cresol, while a solvent for polyesters is a mixture of one part phenol and three parts meta-cresol by volume. These high molecular weight varieties of the polymers, though generally somewhat less soluble than the lower molecular weight varieties, are more useful for most purposes, since they excel in toughness and durability.

The following examples in which parts, proportions, and percentages are by weight illustrate further the application of the principles of the invention.

*Example I*

To one part of polyhexamethylene adipamide there was added two parts of solid dimethylsulfone and the mixture heated to 200° C. At this temperature solution of the polymer was complete in the molten dimethylsulfone and the solution became clear, almost colorless, and very viscous. This solution was suitable for extrusion into a non-solvent coagulating bath to yield fibers or for casting films, as was demonstrated by the fact that fibers could be pulled from the solution by dipping in a glass rod. When these fibers were washed with water to remove the solvent, they possessed appreciable elongation.

Example II

To one part of polyethylene terephthalate there was added seven parts of solid dimethylsulfone and the mixture heated to 230° C. At this temperature solution of the polymer was complete in the molten dimethylsulfone and the solution became clear. This solution was suitable for extrusion into a non-solvent coagulating bath to yield fibers or for casting films.

Example III

To one part of 2,4-polyurethane derived from ethylene diamine and the bis-chloroformate of 1,4-butanediol there was added five parts of solid dimethylsulfone and the mixture heated to 160° C. The dimethylsulfone melted above 115° C. From a temperature of 150° C. solution of the polymer was complete and the solution became clear and very viscous. This solution was suitable for extruding into a non-solvent coagulating bath to yield fibers or for casting films, as was demonstrated by coating a glass plate with the polymer solution and immersing in water to coagulate the film. After this immersion the film formed was clear, flexible and strong.

In the foregoing examples, the invention has been illustrated with particular reference to solutions of polyethylene terephthalate, polyhexamethylene adipamide, and 2,4-polyurethane, but it is to be understood that the invention is not limited to these particular polymers but rather to the synthetic linear condensation polymers comprising polyamides, polyesters, and polyurethanes as a class. Any of the polymers described above in this specification can be substituted for those polymers set forth in the examples with only minor changes in proportions and temperatures being required.

While these solutions are generally prepared by heating on a bath, other suitable means may be used. Stirring of the mixtures during the heating process is advantageous but is not always necessary.

The properties of the objects formed from the compositions herein described may be modified by appropriate modification of the composition. Thus, the compositions of this invention may have incorporated therein various modifying agents, such as plasticizers, dyes, pigments, diluents, resins, cellulose derivatives, waxes, water repellents, luster modifying agents, flame repellents, and the like. Solutions of any of the synthetic linear condensation polymers can be solution blended and precipitated to give homogeneous blends, where melt blending is undesirable or impractical.

Fibers and filaments can be prepared by either dry-spinning or wet-spinning into suitable coagulating baths. Filaments obtained by these methods have a rougher surface and a more porous structure than those obtained by melt spinning. Staple fibers made by cutting these filaments, therefore, can be spun into yarns more readily than staple fibers made from melt spun filaments.

Although specific reference has been made to the use of solutions for the formation of films and filaments, the invention is not restricted thereto, since the solutions are useful for forming a variety of objects irrespective of the shape of the object. Typical objects which can be formed from the solution are bristles, ribbons, sheets, and plasticized or otherwise modified solid compositions useful for making molded articles. The solutions are also useful for application as lacquers on wood, metal, glass, and other surfaces, for coating wire, fabrics, regenerated cellulose, and the like, and for impregnating fabric and other porous material.

As many widely different embodiments of this invention may be made without departing from the spirit and scope thereof, it is to be understood that the invention is not limited to the specific embodiments thereof except as defined in the appended claims.

I claim:

1. A composition of matter comprising a solution in molten dimethylsulfone of a synthetic linear condensation polymer selected from the group consisting of linear polyamides containing as an integral part of the main polymer chain recurring groups of the general formula

wherein R is selected from the group consisting of hydrogen and a monovalent hydrocarbon radical and which groups are separated by not less than two carbon atoms, linear polyesters of dicarboxylic acids and glycols in which the terminal hydroxy groups are separated by from two to ten methylene groups inclusive, and linear polyurethanes containing as an integral part of the main polymer chain recurring groups of the general formula

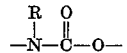

wherein R is selected from the group consisting of hydrogen and a monovalent hydrocarbon radical and which groups are separated by not less than two carbon atoms.

2. A composition of matter comprising a solution in molten dimethylsulfone of a synthetic linear condensation polyester of dicarboxylic acids and glycols in which the terminal hydroxy groups are separated by from two to ten methylene groups inclusive.

3. A composition of matter comprising a solution of polyhexamethylene adipamide in molten dimethylsulfone.

4. A composition of matter comprising a solution of polycaprolactam in molten dimethylsulfone.

5. A composition of matter comprising a solution of polyethylene terephthalate in molten dimethylsulfone.

6. A composition of matter comprising a solution of polytetramethylene-N-ethylene carbamate in molten dimethylsulfone.

7. A composition of matter comprising a solution of polytetramethylene-N-tetramethylene carbamate in molten dimethylsulfone.

8. A process for preparing a fiber-forming solution comprising mixing with dimethylsulfone a synthetic linear condensation polymer selected from the group consisting of linear polyamides containing as an integral part of the main polymer chain recurring groups of the general formula

wherein R is selected from the group consisting of hydrogen and a monovalent hydrocarbon radical and which groups are separated by not less than two carbon atoms, linear polyesters of dicarboxylic acids and glycols in which the terminal hydroxy groups are separated by from two to ten methylene groups inclusive, and linear polyurethanes containing as an integral part of the main polymer chain recurring groups of the general formula

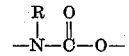

wherein R is selected from the group consisting of hydrogen and a monovalent hydrocarbon radical and which groups are separated by not less than two carbon atoms and heating the mixture until said polymer is substantially dissolved in molten dimethylsulfone.

9. A process for preparing a fiber-forming solution comprising dissolving in molten dimethylsulfone a synthetic linear condensation polymer selected from the group consisting of linear polyamides containing as an integral part of the main polymer chain recurring groups of the general formula

wherein R is selected from the group consisting of hydrogen and a monovalent hydrocarbon radical and which groups are separated by not less than two carbon atoms, linear polyesters of dicarboxylic acids and glycols in which the terminal hydroxy groups are separated by from two to ten methylene groups inclusive, and linear polyurethanes containing as an integral part of the main polymer chain recurring groups of the general formula

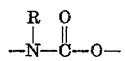

wherein R is selected from the group consisting of hydrogen and a monovalent hydrocarbon radical and which groups are separated by not less than two carbon atoms.

References Cited in the file of this patent

UNITED STATES PATENTS 2,404,717  Houtz ---------------- July 23, 1946